DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1348

T882,024

TWO COLOR DIRECT-PRINT PHOTOGRAPHIC SYSTEMS

Larry H. Feldman, % Kodak Park Works, Rochester, N.Y. 14650

Filed June 29, 1970, Ser. No. 50,989
Int. Cl. G03c *5/32, 5/24, 7/00*
U.S. Cl. 96—45.2
No Drawing. 14 Pages Specification

There are disclosed direct-print silver halide photographic elements capable of producing two or more image colors. Such elements comprise two or more direct-print emulsions, each responding to different bands of visible radiation or being of different photographic speed. Emulsions responding to different bands of visible radiation produce different colored images when exposed to a high intensity short duration light source through appropriate colored filters and thereafter photodeveloped. Elements comprised of emulsions having different photographic speeds yield multicolored images when exposed to an intensity modulated light source. Image color and hue for non-selective exposure, at a fixed exposure time, are intensity dependent, and may be altered by appropriate selection of emulsion addenda. Such elements are particularly suitable for making oscillograph traces.

Various direct-print emulsions are suitable, such as those wherein the silver halide grains are formed in the presence of lead ions. Preferred classes of emulsions are described in Davey et al., U.S. 2,592,250 and Colt U.S. 3,418,122. Suitable halogen acceptors, such as disclosed in Bacon et al., U.S. Pat. 3,447,927, may be present. Various spectrally sensitizing dyes, such as merocyanine or cyanine dyes, or those described in McBride, U.S. Pat. 3,287,136, may be employed. Exemplary dyes include 3-ethyl - 5-[(3-ethyl-2-benzothiazolinylidene)-1-methylethylidene]-2-thio-2,4-oxazolidinedione and 3-ethyl-5-[(1-ethylnaphthol[1,2-d]thiazolin-2-ylidene)-1-methylethylidene] rhodanine. Conventional addenda such as coating aids, plasticizers, sensitizers, hardeners, etc., as disclosed in Bacon et al., U.S. 3,447,927 (columns 2–6) may be present.